United States Patent [19]

Tomes

[11] Patent Number: 4,581,133

[45] Date of Patent: Apr. 8, 1986

[54] SOLVENT RECLAMATION APPARATUS

[76] Inventor: Ralph E. Tomes, 3033 Jersey Ave. N., Crystal, Minn. 55427

[21] Appl. No.: 578,506

[22] Filed: Feb. 9, 1984

[51] Int. Cl.$^4$ .......................................... D06F 43/08
[52] U.S. Cl. .................................. 210/90; 68/18 C; 68/18 F; 134/109; 202/185 E; 202/204; 210/175; 210/259; 210/411
[58] Field of Search ................ 134/105, 108, 109–111; 210/167, 259, 295, 275, 416.1, 90, 175, 411; 68/18 R, 18 C, 18 F; 202/185 E, 185 R, 185 C, 187, 204

[56] References Cited

U.S. PATENT DOCUMENTS

| | | | |
|---|---|---|---|
| 2,836,045 | 5/1958 | Smith | 210/167 X |
| 3,085,415 | 4/1963 | Gosnell | 68/18 R X |
| 3,110,544 | 11/1963 | Moulthrop | 68/18 R |
| 3,203,754 | 8/1965 | Young et al. | 210/167 X |
| 3,352,763 | 11/1967 | Shields | 210/167 X |
| 3,674,650 | 7/1972 | Fine | 210/167 X |
| 3,771,334 | 11/1973 | Quackenbush | 68/18 C |
| 4,003,798 | 1/1977 | McCord | 134/109 X |
| 4,352,739 | 10/1982 | Oliver, Jr. et al. | 210/167 X |
| 4,513,590 | 4/1985 | Fine | 68/18 F X |

FOREIGN PATENT DOCUMENTS

| | | | |
|---|---|---|---|
| 739683 | 8/1966 | Canada | 68/18 R |
| 441238 | 1/1936 | United Kingdom | 68/18 R |

Primary Examiner—Philip R. Coe
Attorney, Agent, or Firm—Merchant, Gould, Smith, Edell, Welter & Schmidt

[57] ABSTRACT

An apparatus (10) for use with a dry cleaning system having a filter for filtering the dirty solvent comprises a first pressure vessel (28) for vaporizing the filtered solvent and a second pressure vessel (58) for condensing the vapors into purified liquid solvent for collection and reuse. The upper end of the second pressure vessel (58) is upset to provide an annular chamber about the upper end of the condenser coil (76) which extends in closely spaced apart relationship into the reduced lower end of the second pressure vessel, so that clogging is avoided and better contact with the condenser coil and thus more complete condensation is achieved. In the preferred embodiment, the apparatus 10 includes a valve arrangement (104, 106, 108 and 118) by which the filter can be backflushed with hot fluid, such as steam in order to recover solvent from the saturated filter and render it safe for ordinary disposal.

9 Claims, 1 Drawing Figure

SOLVENT RECLAMATION APPARATUS

TECHNICAL FIELD

The present invention relates generally to a reclamation apparatus for use with dry cleaning equipment. More particularly, this invention concerns an apparatus adapted for use with a cartridge assembly to reclaim filtered solvent on a continuous basis by means of distillation, which apparatus is also adapted for periodic back flushing of the cartridge assembly to reclaim additional solvent captured in the filters so that the dirty filters can be safely discarded.

BACKGROUND ART

Dry cleaning involves the use of chemical solvents instead of water to clean the fabric of garments and the like. The solvents typically comprise substantially nonacqueous organic solvents such as trichloroethylene, tetrachloroethylene or naptha, to which special detergents are often added to enhance cleansing. Dirt and grease become dissolved in the solvent as the dirty garments are scrubbed in the rotating drums. Hair, lint, etc. are also picked up by the solvent. After cleansing, the drums are rotated at a higher speed to separate the dirty solvent from the garments. The cleaned garments are then removed from the drum for drying and pressing before return to the customer, while the dirty solvent is collected for recycling.

Purification of such cleaning solvents is typically accomplished by means of filtration and/or distillation. The dirty solvent is first passed through a filter assembly wherein the non-dissolved matter such as lint, hair etc., is separated from the solvent. After filtration, the solvent is also distilled to remove any remaining oil, grease or water therefrom. It will be appreciated that such solvent is volatile material which must be handled with care. Solvent vapors can pose a health hazard upon prolonged exposure without adequate ventilation.

Heretofore, the usual practice has been to discard the filter elements when they became dirty and clogged. It will be appreciated that replacement of such filter elements involves expense in terms of the cost of the filter elements themselves, the labor involved in removing and replacing them, and the down-time of the cleaning system. In addition, such clogged filter elements are usually saturated with solvent which is lost upon replacement. Finally, clogged filter elements saturated with solvent are subject to hazardous waste requirements, which in turn involve additional expense and special handling techniques for disposal. Periodic removal and replacement of the filter elements in a cleaning system thus involves substantial expense.

A need has thus arisen for an improved reclamation apparatus for a dry cleaning system whereby the saturated solvent in the filter element can be periodically extracted to recycle additional solvent, to extend the useful life of the filter elements, to render otherwise hazardous dirty filter elements safe for ordinary disposal, and to reduce down-time of the cleaning system due to filter maintenance.

SUMMARY OF THE INVENTION

The invention relates to an improved reclamation apparatus for a dry cleaning plant which overcomes the foregoing and other difficulties associated with the prior art. In accordance with the invention, there is provided a reclamation apparatus for use with the filter assembly of a dry cleaning system which is adapted for periodic back flushing of the filter assembly in order to extract additional solvent for recycling and to render the dirty filter elements otherwise fit for ordinary disposal. The reclamation apparatus herein includes a first vessel with a heater for receiving the filtered solvent and raising the temperature thereof to vaporization, and a second vessel with a condensing coil therein for receiving the vaporized solvent and lowering the temperature thereof to distill the vapor into condensed water which can be drained away, and condensed solvent which can be collected for reuse in the cleaning plant. In accordance with the preferred embodiment, the second vessel includes an upset, relatively larger diameter upper end defining an annular chamber surrounding the upper portion of the condensing coil to counteract clogging and improve contact between the vapors and the coil to effect better condensing.

The improved reclamation apparatus herein further includes a steam separator for receiving wet or saturated steam and separating it into dry steam and condensate. The condensate is connected for return via a return steam line, while the dry steam is connected via a suitable valving arrangement to the inlet and outlet of the filter assembly for periodic backflushing to extract additional solvent from the saturated filter element therein and direct the vaporized solvent into the first vessel and onto the second vessel for condensation.

BRIEF DESCRIPTION OF DRAWING

A better understanding of the invention can be had by reference to the following Detailed Description in conjunction with the accompanying Drawing, wherein the sole FIGURE is a partially schematic, vertical section view of the solvent reclamation apparatus herein.

DETAILED DESCRIPTION

Figure 1:
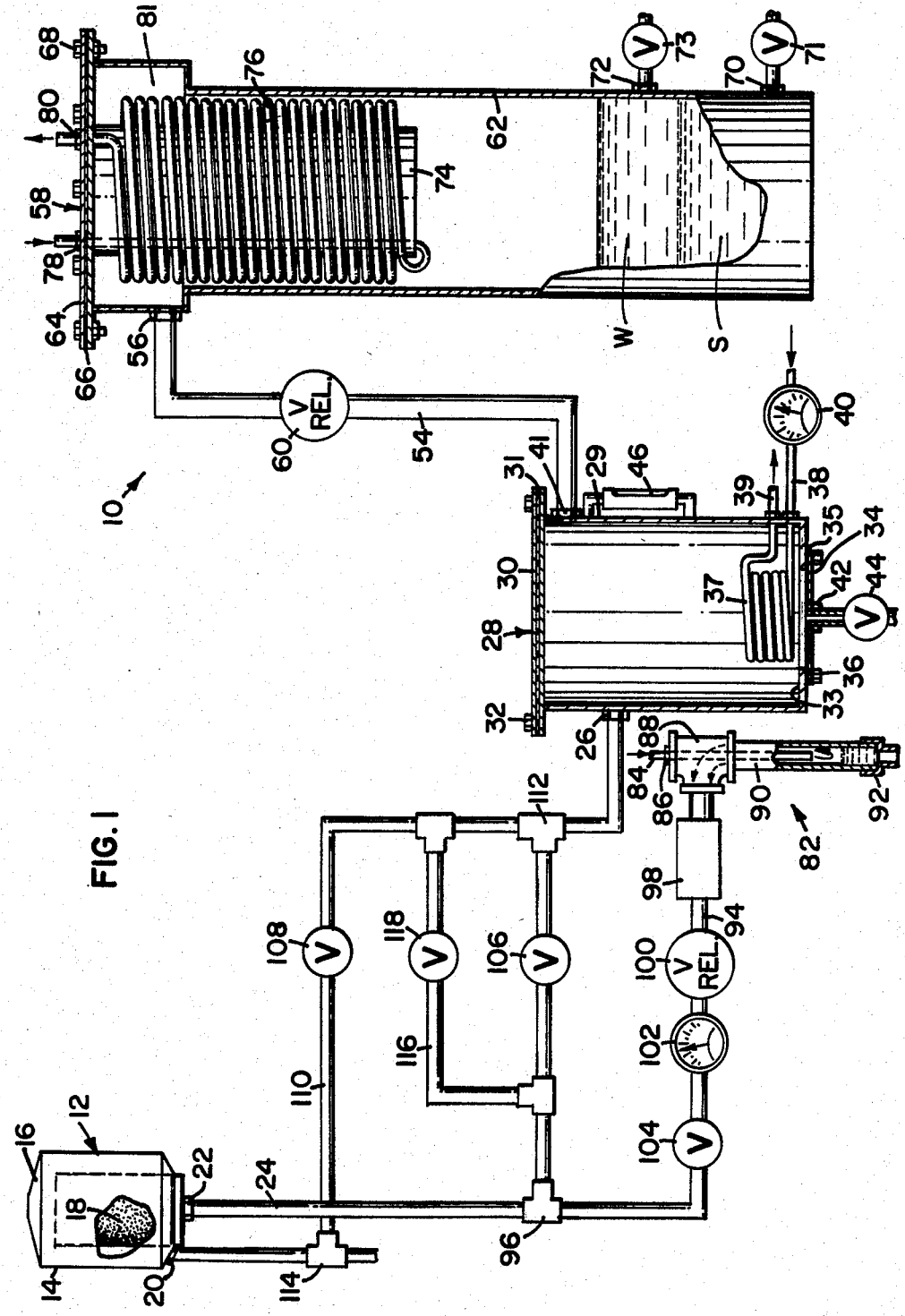

Referring now to the Drawing, there is shown the reclamation apparatus 10 incorporating the invention. The apparatus 10 is particularly adapted for use with the filter 12 of a filter assembly (not shown) in a dry cleaning plant. Such filter assemblies typically incorporate multiple filters, however, for purposes of clarity only one filter 12 has been shown. The filter 12 includes a canister 14 and removable cover 16 enclosing a cylindrical filter element 18. The canister 14 includes an inlet 20 opening into the space outside the filter element 18 within the canister, and an outlet 22 opening into the interior of the filter element. The inlet 20 is connected to the drum (not shown) of the cleaning system for receiving the dirty solvent to be filtered. The outlet 22 is connected by line 24 to an inlet 26 of a first vessel 28 of the reclamation apparatus 10 herein.

As will be explained more fully hereinafter, the reclamation apparatus 10 is adapted both for receiving filtered solvent from the filter 12 and purifying the solvent by distillation for reuse on a continuous basis, and for periodically backflushing the filter element 18 of the filter in order to recover additional solvent as well as to render the filter element 18 safe for ordinary disposal.

The reclamation apparatus 10 includes a first pressure vessel 28 which, as illustrated, includes a receptacle 29 closed at the upper end by a cover 30, sealing gasket 31, and fasteners 32. The receptacle 29 further includes a bottom wall 33 which, according to the preferred embodiment, includes a central opening closed by a plate 34, sealing gasket 35, and fasteners 36. A heater 37 is mounted on the plate 34. As illustrated, the heater 37 comprises a coil having an inlet 38 and outlet 39 for conducting steam therethrough. The inlet 38 is preferably connected through a pressure gauge 40 to a suitable source of steam, while the outlet 39 is connected to a return steam line. The inlet 26 for the filtered solvent is located about midway between the bottom wall 33 and cover 30, while an outlet 41 is located at a relatively higher level near the upper end of the receptacle 29.

It will therefore be appreciated that the filtered solvent and associated vapors from filter 12 are received in the pressure vessel 28. The filtered solvent is heated by immersion coil 37 to vaporization. The removable bottom plate 34 facilitates repair or replacement of the coil 37, as well as cleaning of the receptacle 29. A liquid drain outlet 42 and shut-off valve 44 are preferably provided in the bottom plate 34 to allow for drainage. If desired, the vessel 28 can also be provided with a sight glass 46 for reading the level of liquid filtered solvent therein.

The vapor outlet 41 of the first pressure vessel 28 is connected by line 54 to the inlet 56 of a second pressure vessel 58. A pressure relief valve 60 is preferably provided in the line 54 for safety purposes. The valve 60 can be set to open at any suitable pressure, such as about 15 pounds p.s.i. The second pressure vessel 58 includes a receptacle 62 which is closed at the upper end by a cover 64, gasket 66 and fasteners 68. It will be noted that the receptacle 62 includes an upset upper end, in which the inlet 56 is located, and a relatively longer lower end of reduced diameter which includes a pair of vertically spaced apart outlets 70 and 72. A sleeve 74 secured to the underside of the cover 64 extends downwardly into the receptacle 62.

A condenser coil 76 is wrapped about the sleeve 74 within the second pressure vessel 58. The coil 76 extends from one end, which is connected to an inlet fitting 78 on the cover 64, down through the center of the sleeve 74 and then spirals tightly about the sleeve upwardly toward the cover to connection with an outlet fitting 80. The inlet fitting 78 is preferably connected to a source of coolant, such as cold water at about 50° F., so that the coldest portion of the coil is near the bottom of the sleeve 74. The sleeve 74 and coil 76 are preferably sized so as to provide a close spacing, such as about ⅛th inch, with the inside wall of the reduced lower end portion of the receptacle 62. The significance of this will be explained in the following paragraph.

As vaporized solvent enters the inlet 56 of the second pressure vessel 58, it flows into the annular chamber 81 at the upper end of the receptacle 62, and then downwardly between the coil 76 and the reduced lower end portion so that maximum contact with the condensing coil 76 is obtained. Provision of the larger annular chamber 81 at the upper end of the receptacle 62 facilitates better distribution of flow across the coil 76 and reduces the possibility of clogging from any remaining lint, dirt etc. As the hot vaporized solvent passes over the condensing coil 76, the water and solvent vapors therein condense out into liquid water W and liquid solvent S. The liquid solvent S which is typically heavier than water W, can be removed via outlet 70 and shut-off valve 71 for reuse in the cleaning system, while the water can be drained via the outlet 72 and shut-off valve 73.

The reclamation apparatus 10 herein further includes means for backflushing the filter 12. In the preferred embodiment, as illustrated, this comprises a steam separator 82 by which the water or condensate can first be removed from wet or saturated steam to produce substantially dry steam which is then directed back through the filter 12 to backflush the filter element 18 therein. It will be understood, however, that hot air or something other than steam can be utilized for backflushing the filter 12.

The steam separator 82 includes a tube 84 which extends through a bushing 86 in a T-connection 88 into a relatively larger section of pipe 90 extending from the opposite side of the T-connection. The inner tube 84 can be about one-half inch in diameter, for example, while the outer tube 90 can be about two inches in diameter. The outer end of the inner tube 84 is adapted for connection to a source of wet or saturated steam, which is typically available in a dry cleaning installation. The lower end of the outer pipe 90 is connected through a reducer 92 to a return steam line. As wet steam enters the inner tube 84 and exits into the outer tube 90, it expands so that the condensate collects at the bottom of the outer tube while the dry steam rises around the inner tube and through the T-connection 88 into a line 94 which is connected at the other end to a T-connection 96 in line 24. A pressure regulator 98, safety valve 100, pressure gauge 102, and normally closed shut-off valve 104 are provided in line 94 as shown. The safety valve 100 can be set at any suitable pressure, such as, 15 pounds p.s.i., for example.

In order to provide for reverse flow through the filter 12, a valving and bypass arrangement is provided. A normally closed valve 106 is connected in the line 24 between the outlet 22 of the filter 12 and the inlet 26 of the first pressure vessel 28. Another normally closed valve 108 is provided in a line 110 extending between a T-connection 112 in the line 24 between valve 106 and inlet 26, and another T-connection 114 connected to the inlet 20 of the filter 12. A bypass line 116 and a normally open valve 118 are connected across the valve 106.

The reclamation apparatus 10 operates as follows. The apparatus 10 herein has two modes of operation. In the continuous clean mode, valves 104, 106 and 108 are closed, while valve 118 is open to allow filtered solvent from the filter 12 to flow from the outlet 22 to the inlet 26. The line 116 and valve 118 are preferably sized to allow a flow rate of about 5 to 10 gallons per hour so that the first pressure vessel 28 is not overfilled. The filtered solvent is thence purified by vaporization in the first pressure vessel 28 followed by condensation in the second pressure vessel 58.

The other operational mode of the apparatus 10 is utilized to backflush the filter 12 to pass steam through the filter 12 in reverse flow direction in order to recover at least some of the saturated solvent in the filter element 18. In this mode the settings of three valves are reversed such that valves 104 and 108 are opened while valve 118 is closed so that steam from the separator 82 can enter the outlet 22 of the filter 12 and flow in reverse direction across the filter element 18 carrying solvent into the inlet 26 for distillation.

Satisfactory operation of the reclamation apparatus 10 herein has been experimentally verified. After backflushing with steam, a filter element was removed from the filter, analyzed, and determined to contain less than about 0.01 percent tetrachloroethylene. This is well below the level considered to constitute hazardous waste such that a significant amount of tetrachloroethylene was recovered from the filter element rendering it safe for ordinary disposal.

From the foregoing, it will be apparent that the present invention comprises an improved reclamation apparatus having several advantages over the prior art. One significant advantage involves that fact that the apparatus herein can be utilized in either one of two different modes to effect more thorough reclamation of the cleaning solvent. This results in significant cost savings in terms of more recoverable solvent, reduced frequency of filter element changes, and less down-time of the cleaning system. Other advantages will be evident to those skilled in the art.

Although particular embodiments of the invention have been illustrated in the accompanying Drawings and described in foregoing Detailed Description it will be understood that the invention is not limited to the embodiments disclosed, but is intended to embrace any alternatives, equivalents, modifications and/or rearrangements of elements falling within the scope of the invention as defined by the following claims.

What is claimed is:

1. Apparatus for reclaiming solvent used in a dry cleaning system having a filter with an inlet and an outlet, comprising:
   a first pressure vessel having an inlet connected to the outlet of said filter for receiving filtered solvent therefrom, and an outlet located at a level above the inlet;
   means for heating said first pressure vessel to vaporize the solvent therein;
   a second pressure vessel having upper and lower ends, the upper end including an inlet connected to the outlet of said first pressure vessel and being of predetermined diameter and length, the lower end being of relatively greater length but smaller diameter and including a pair of vertically spaced-apart outlets;
   a sleeve disposed in the upper end of said second pressure vessel and extending in predetermined spaced-apart relationship into the lower end thereof; and
   a condenser coil disposed about said sleeve between the upper and lower ends of said second pressure vessel, said condenser coil being adapted for circulation of coolant therethrough at a predetermined temperature low enough to condense the vaporized solvent into water and solvent condensate fractions for removal via the respective outlets of said second pressure vessel.

2. The apparatus of claim 1, further including:
   a pressure relief valve connected between the outlet of said first pressure vessel and the inlet of said second pressure vessel;
   a sight glass mounted on said first pressure vessel for indicating the level of liquid solvent therein;
   said first pressure vessel including a drain in the lower end thereof; and
   a normally closed external valve connected to the drain of said first pressure vessel.

3. The apparatus of claim 1, wherein said heating means comprises a heating coil disposed inside said first pressure vessel on the lower end thereof, said heating coil being adapted for connection to a source of hot fluid.

4. The apparatus according to claim 3, wherein the hot fluid is steam.

5. The apparatus of claim 1, further including:
   a first normally-closed valve connected between the inlet of said first pressure vessel and the outlet of said filter;
   a second normally-closed valve connected between the inlet of said first pressure vessel and the inlet of said filter;
   a third normally-closed valve connected between a source of stream and the outlet of said filter; and
   a normally-open bypass valve connected across said first valve.

6. Apparatus for reclaiming solvent used in a dry cleaning system having a filter with an inlet and an outlet, comprising:
   a first pressure vessel having an inlet and an outlet located at a level above the inlet;
   a first normally closed valve connected between the outlet of said filter and the inlet of said first pressure vessel;
   a second normally closed valve connected between the inlet of said first pressure vessel and the inlet of said filter;
   a third normally closed valve connected between the outlet of said filter and a source of steam;
   a normally open bypass valve connected across said first valve;
   means for heating said first pressure vessel to vaporize the solvent therein;
   a second pressure vessel having upper and lower ends, the upper end including an inlet connected to the outlet of said first pressure vessel and being of predetermined diameter and length, the lower end being of relatively greater length but smaller diameter and including a pair of vertically spaced-apart outlets;
   a sleeve disposed in the upper end of said second pressure vessel and extending in predetermined spaced-apart relationship into the lower end thereof; and
   a spiral condenser coil disposed about said sleeve between the upper and lower ends of said second pressure vessel, said condenser coil being adapted for circulation of coolant therethrough at a predetermined temperature low enough to condense the vaporized solvent into water and solvent condensate fractions for removal via the respective outlets of said second pressure vessel.

7. The apparatus of claim 6, further including:
   a pressure relief valve connected between the outlet of said first pressure vessel and the inlet of said second pressure vessel;
   a sight glass mounted on said first pressure vessel for indicating the level of liquid solvent therein;
   said first pressure vessel including a drain in the lower end thereof; and 8. The apparatus of claim 6, wherein said heating means comprises a heating coil disposed inside said first pressure vessel on the lower end thereof, said heating coil being adapted for connection to a source of steam.

9. The apparatus of claim 6, further including:
   a pressure gauge, a pressure relief valve, and a pressure regulator connected between said third valve and the source of steam.

* * * * *